C. Y. AKES.
ICE SAWING MACHINE.
APPLICATION FILED JUNE 26, 1911.
1,041,717.
Patented Oct. 22, 1912.
3 SHEETS—SHEET 1.
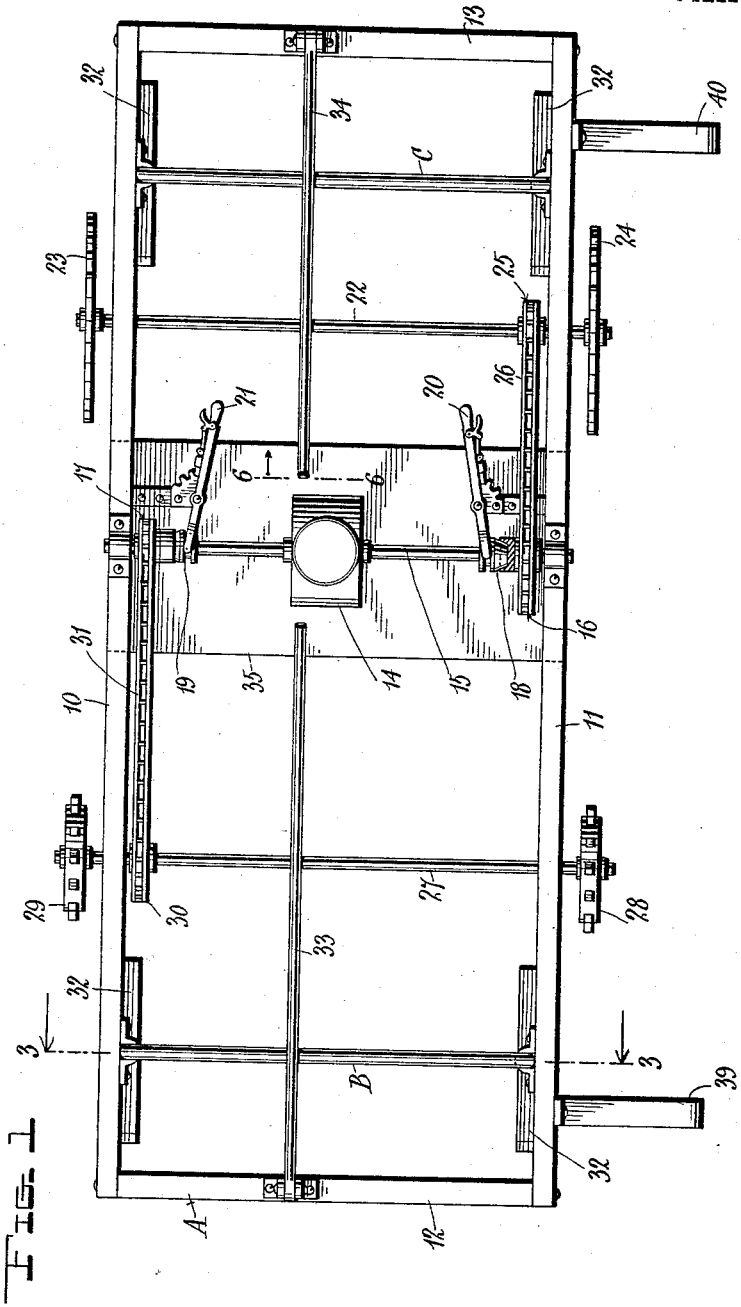
Witnesses
Inventor
C.Y. Akes,
By
Attorneys

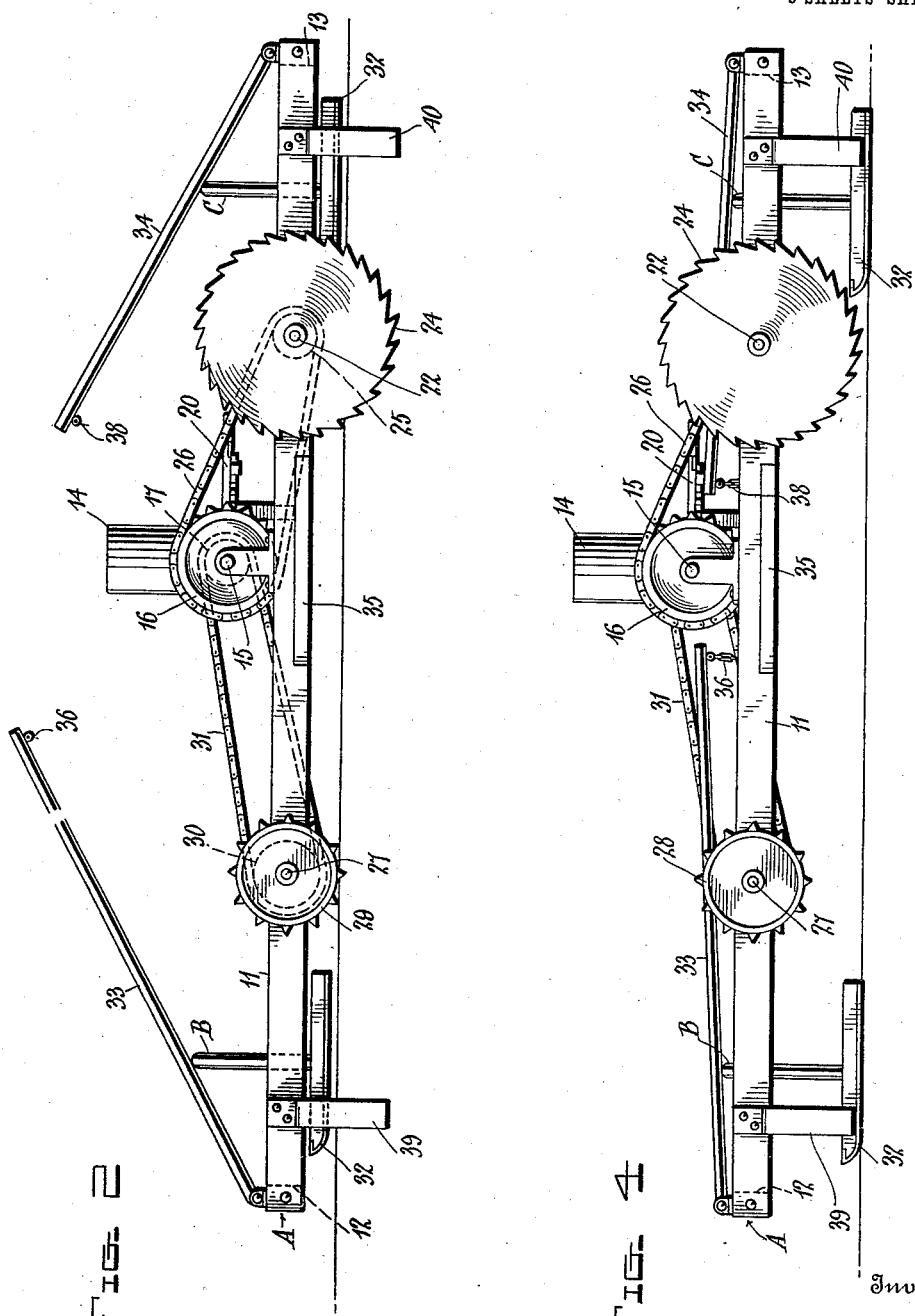

C. Y. AKES.
ICE SAWING MACHINE.
APPLICATION FILED JUNE 26, 1911.
1,041,717.
Patented Oct. 22, 1912.
3 SHEETS—SHEET 3.
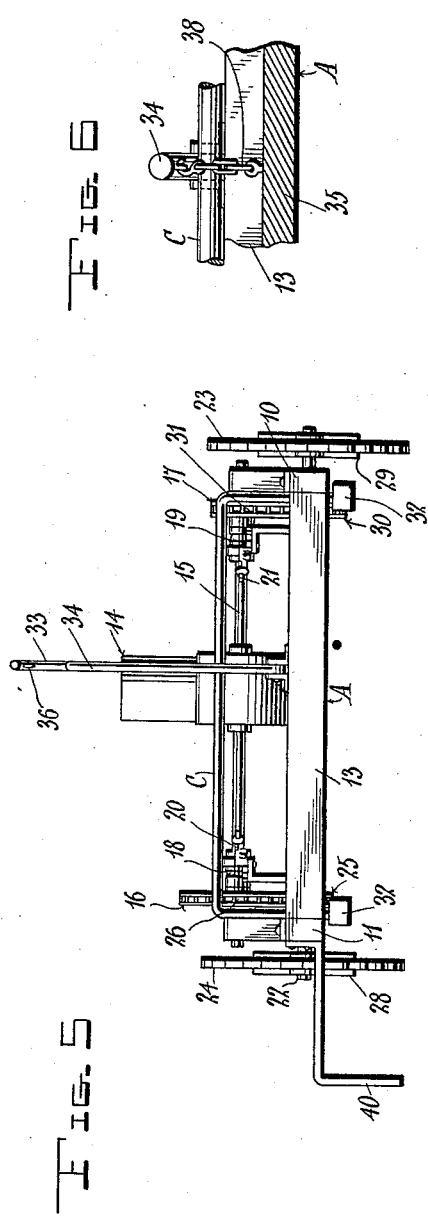
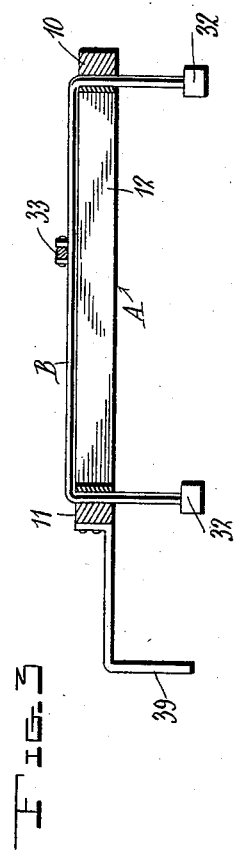
Witnesses
Inventor
C. Y. Akes,
By 
Attorneys

UNITED STATES PATENT OFFICE.

CHARLES Y. AKES, OF CUSTER, SOUTH DAKOTA, ASSIGNOR TO MARY J. TUBBS AND MERRITT J. BAILEY, BOTH OF CUSTER, SOUTH DAKOTA.

ICE-SAWING MACHINE.

1,041,717. Specification of Letters Patent. Patented Oct. 22, 1912.

Application filed June 26, 1911. Serial No. 635,351.

*To all whom it may concern:*

Be it known that I, CHARLES Y. AKES, a citizen of the United States, residing at Custer, in the county of Custer, State of South Dakota, have invented certain new and useful Improvements in Ice-Sawing Machines; and I do hereby declare the following to be a full, clear, and exact description of the invention, such as will enable others skilled in the art to which it appertains to make and use the same.

This invention relates to ice sawing machines.

The object of the invention resides in the provision of a machine of the character named which is adapted to be self propelled during the sawing operation and which includes means, whereby the saw may be elevated free of engagement with the ice when the machine is being transported from one location to another.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, in which—

Figure 1 is a plan view of an ice sawing machine constructed in accordance with the invention. Fig. 2 a side elevation of what is shown in Fig. 1. Fig. 3 a section on the line 3—3 of Fig. 1. Fig. 4 a view similar to Fig. 2 showing the saw members adjusted to elevated position so as to permit the movement of the machine over the ice without engagement between the saw members and the ice. Fig. 5 an end view of the machine, and Fig. 6 a section on the line 6—6 of Fig. 1.

Referring to the drawings, the machine is shown as comprising a rectangular frame A which includes side members 10 and 11 and end members 12 and 13. Supported centrally upon the frame A is a motor of the explosive type shown typically at 14. This motor is provided with the usual drive shaft 15 the latter being suitably journaled in the side members 10 and 11 of the frame A. Loosely mounted on opposite ends respectively of the drive shaft 15 are sprocket wheels 16 and 17, the former of which receives its rotation from the shaft 15 through the medium of a friction clutch 18 while the latter receives its rotation from the shaft 15 by means of a friction clutch 19, said clutches being operated by means of levers 20 and 21 respectively, suitably mounted on the frame A. Journaled between the side members 10 and 11 adjacent the end member 13 is a shaft 22, the ends of which are extended beyond said side members respectively and have fixed thereon circular saw blades 23 and 24 which latter are adapted to engage and cut the ice during the operation of the machine.

Fixed on the shaft 22 in alinement with the sprocket wheel 16 is a sprocket wheel 25 and traveling on said sprocket wheels 16 and 25 is a sprocket chain 26 whereby the rotation of the shaft 15 is transmitted to the shaft 22. Journaled between the side members 10 and 11 adjacent the end member 12 is a shaft 27, the ends of which are extended beyond the side members of the frame and have fixed thereon respectively toothed drive wheels 28 and 29.

Fixed on the shaft 27 in alinement with the sprocket wheel 17 is a sprocket wheel 30 and traveling on the sprocket wheels 17 and 30 is a sprocket chain 31 whereby the rotation of the shaft 15 is transmitted to the shaft 27. Under normal conditions the drive wheels 28 and 29 engage the ice over which the machine is traveling and when rotated effect the propulsion of the machine.

In order to maintain the drive wheels and circular saws out of engagement with the ice during the transportation of the machine from one location to another there are provided at each end of the frame U-shaped members B and C each of which have their arms slidably mounted in the side members of the frame A. Mounted on the terminals of the arms of the frames B and C are runners 32 which are adapted to support the frame A when the latter is adjusted upwardly on the arms of the members B and C. In order to accomplish this adjustment there is pivotally mounted on the end member 12 a lever 33 which passes over the bight portion of the member B. A similar lever 34 is pivoted on the end member 13 and passes over the bight portion of the U- shaped member C. In order to elevate the frame A with respect to the runners 32 it is only necessary to force down the free ends of the levers 33 and 34 with the bight portions of the members B and C respectively constituting fulcrums. Connecting the side members 10 and 11 between the shafts 22 and 27 is a platform 35 upon which the motor rests and to which the free end of the lever 33 is attached by means of a connection 36 to hold said lever in position to maintain the adjacent end of the frame A elevated with respect to the runners 32. The end of the lever 34 is also fastened to the platform 35 by means of a connection 38, so as to hold the end of the lever 34 in position to maintain the adjacent end of the frame A elevated with respect to runners carried by the member C. Extending laterally from the side member 10 at each end are gage arms 39 and 40, the outer ends of which are bent so as to run in the adjacent kerf previously cut so as to keep the machine parallel therewith.

What is claimed is:

In a machine of the class described the combination of a frame, a motor carried by the frame, a U-shaped member disposed at each end of the frame and having its arms slidably connected to the frame, a runner mounted on each free end of the arms of each U-shaped member respectively, a lever pivoted to each end of the frame and adapted when operated to engage and fulcrum upon the bight portion of the adjacent U-shaped member, whereby said frame may be moved relatively to the arms of said U-shaped members, a cutting mechanism, a propelling mechanism and connections between said mechanisms and the motor whereby the actuation of the latter will simultaneously operate said mechanisms.

In testimony whereof, I affix my signature, in presence of two witnesses.

CHARLES Y. AKES.

Witnesses:
C. E. PERRIN,
T. W. DELUATE.

Copies of this patent may be obtained for five cents each, by addressing the "Commissioner of Patents, Washington, D. C."